United States Patent
Marino et al.

(10) Patent No.: US 8,925,037 B2
(45) Date of Patent: Dec. 30, 2014

(54) SYSTEMS AND METHODS FOR ENFORCING DATA-LOSS-PREVENTION POLICIES USING MOBILE SENSORS

(71) Applicant: Symantec Corporation, Mountain View, CA (US)

(72) Inventors: Daniel Marino, Los Angeles, CA (US); Darren Shou, La Jolla, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 80 days.

(21) Appl. No.: 13/733,131

(22) Filed: Jan. 2, 2013

(65) Prior Publication Data

US 2014/0189784 A1    Jul. 3, 2014

(51) Int. Cl.
   *G06F 17/00* (2006.01)
   *G06F 7/04* (2006.01)
   *G06F 21/60* (2013.01)

(52) U.S. Cl.
   CPC .................................... *G06F 21/60* (2013.01)
   USPC ............................................... 726/1; 726/26

(58) Field of Classification Search
   CPC ....... H04L 9/0872; G06F 21/00; G06F 21/62; G06F 21/6209; G06F 21/6218; G06F 21/6227; G06F 21/6236; G06F 21/6245; G06F 21/629
   USPC .................. 726/1–6, 16–18, 26–30
   See application file for complete search history.

(56) References Cited

U.S. PATENT DOCUMENTS

| | | | |
|---|---|---|---|
| 8,726,405 B1* | 5/2014 | Bailey et al. | 726/29 |
| 2003/0216143 A1* | 11/2003 | Roese et al. | 455/456.1 |
| 2004/0153671 A1* | 8/2004 | Schuyler et al. | 713/201 |
| 2005/0097320 A1* | 5/2005 | Golan et al. | 713/166 |
| 2006/0031682 A1* | 2/2006 | Sakai et al. | 713/182 |
| 2006/0210167 A1* | 9/2006 | Inoue et al. | 382/190 |
| 2010/0005526 A1* | 1/2010 | Tsuji et al. | 726/21 |
| 2010/0014721 A1* | 1/2010 | Steinberg et al. | 382/118 |
| 2010/0024042 A1* | 1/2010 | Motahari et al. | 726/26 |
| 2010/0205667 A1* | 8/2010 | Anderson et al. | 726/19 |
| 2010/0302143 A1 | 12/2010 | Spivack | |
| 2010/0325712 A1 | 12/2010 | Kakuta et al. | |
| 2011/0219423 A1* | 9/2011 | Aad et al. | 726/1 |
| 2011/0247069 A1* | 10/2011 | Slater | 726/22 |
| 2011/0321137 A1* | 12/2011 | Iida et al. | 726/4 |
| 2011/0321143 A1* | 12/2011 | Angaluri et al. | 726/6 |

(Continued)

OTHER PUBLICATIONS

U.S. Appl. No. 61/602,427.*

(Continued)

*Primary Examiner* — Darren B Schwartz
(74) *Attorney, Agent, or Firm* — ALG Intellectual Property, LLC

(57) ABSTRACT

A computer-implemented method for enforcing data-loss-prevention policies using mobile sensors may include (1) detecting an attempt by a user to access sensitive data on a mobile computing device, (2) collecting, via at least one sensor of the mobile computing device, sensor data that indicates an environment in which the user is attempting to access the sensitive data, (3) determining, based at least in part on the sensor data, a privacy level of the environment, and (4) restricting, based at least in part on the privacy level of the environment, the attempt by the user to access the sensitive data according to a DLP policy. Various other methods, systems, and computer-readable media are also disclosed.

20 Claims, 6 Drawing Sheets

(56) References Cited

U.S. PATENT DOCUMENTS

| | | | |
|---|---|---|---|
| 2012/0011559 A1* | 1/2012 | Miettinen et al. | 726/1 |
| 2012/0185910 A1* | 7/2012 | Miettinen et al. | 726/1 |
| 2012/0198570 A1* | 8/2012 | Joa et al. | 726/30 |
| 2012/0331527 A1 | 12/2012 | Walters et al. | |
| 2013/0097709 A1* | 4/2013 | Basavapatna et al. | 726/25 |
| 2013/0197998 A1* | 8/2013 | Buhrmann et al. | 705/14.53 |
| 2013/0227712 A1* | 8/2013 | Salem et al. | 726/30 |
| 2013/0298248 A1* | 11/2013 | Boldrev et al. | 726/26 |
| 2013/0340089 A1* | 12/2013 | Steinberg et al. | 726/27 |
| 2014/0007225 A1* | 1/2014 | Gay et al. | 726/19 |
| 2014/0130127 A1* | 5/2014 | Toole et al. | 726/3 |

OTHER PUBLICATIONS

U.S. Appl. No. 61/591,232.*

Zenprise; Mobile DLP (Data Leakage Prevention); www.zenprise.com/solutions/mobile-data-leakage-prevention/; As accessed on Sep. 11, 2012.

Devicelock; Prevent Devastating Data Leaks by Securing the Endpoints of Your Network; www.devicelock.com/dl/index.htm; As accessed on Sep. 11, 2012.

Daniel Siewiorek et al.; SenSay: A Context-Aware Mobile Phone; Human Computer Interaction Institute and Institute for Complex Engineered Systems; As accessed on Sep. 11, 2012.

\* cited by examiner

SYSTEMS AND METHODS FOR ENFORCING DATA-LOSS-PREVENTION POLICIES USING MOBILE SENSORS

BACKGROUND

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access and mobile computing devices may pose unique challenges for individuals and organizations who wish to allow mobile access to sensitive data but are concerned with preventing the loss and/or exposure of the sensitive data. Individuals and organizations are therefore increasingly looking to data-loss-prevention (DLP) systems to protect their sensitive data.

Conventional DLP systems typically protect sensitive data by ensuring that users that attempt to access sensitive data are properly authenticated and authorized. Unfortunately, simple authentication and authorization procedures may inadequately protect sensitive data in certain environments because, for example, sensitive data may be seen or overheard by others while it is accessed by authorized users (e.g., in crowded environments). Accordingly, the instant disclosure addresses a need for additional and improved systems and methods for enforcing data-loss-prevention policies.

SUMMARY

As will be described in greater detail below, the instant disclosure generally relates to systems and methods for enforcing data-loss-prevention policies using mobile sensors. In one example, a computer-implemented method for enforcing data-loss-prevention policies using mobile sensors may include (1) detecting an attempt by a user to access sensitive data on a mobile computing device, (2) collecting, via at least one sensor of the mobile computing device, sensor data that is indicative of an environment in which the user is attempting to access the sensitive data, (3) determining, based at least in part on the sensor data, a privacy level of the environment, and (4) restricting, based at least in part on the privacy level of the environment, the attempt by the user to access the sensitive data according to a DLP policy.

In one embodiment, the step of determining the privacy level of the environment may include using the sensor data to identify at least one characteristic of the environment that may be a risk factor for data loss.

In some embodiments, the step of determining the privacy level of the environment may include using the sensor data to identify a venue type of the environment that may be a risk factor for data loss. For example, the sensor data may indicate a geographic location of the environment, and the step of using the sensor data to identify the venue type of the environment may include querying a venue-type database using the geographic location for the venue type of the environment.

In certain embodiments, the step of determining the privacy level of the environment may include using the sensor data to identify a number of people within the environment that may be a risk factor for data loss. For example, the sensor data may include audio data collected via an audio sensor of the mobile computing device, and the step of using the sensor data to identify the number of people within the environment may include analyzing the audio data to determine the number of people within the environment. Additionally and/or alternatively, the sensor data may include image data collected via an image sensor of the mobile computing device, and the step of using the sensor data to identify the number of people within the environment may include analyzing the image data to determine the number of people within the environment.

In at least one embodiment, the step of determining the privacy level of the environment may include using the sensor data to identify a number of additional computing devices within the environment that may be a risk factor for data loss. For example, the sensor data may include network data collected via a network sensor of the mobile computing device, and the step of using the sensor data to identify the number of additional computing devices within the environment may include analyzing the network data to determine the number of additional computing devices within the environment.

In other embodiments, the step of determining the privacy level of the environment may include using the sensor data to identify a proximity of people within the environment that may be a risk factor for data loss and/or using the sensor data to identify an orientation of the mobile computing device that may be a risk factor for data loss.

In one embodiment, the step of collecting sensor data that is indicative of the environment may include (1) collecting, prior to the attempt to access the sensitive data, past sensor data that is indicative of the environment in which the user is attempting to access the sensitive data and (2) collecting, in response to the attempt to access the sensitive data, present sensor data that is indicative of the environment in which the user is attempting to access the sensitive data, and the step of determining the privacy level of the environment may include comparing the past sensor data with the present sensor data.

In some embodiments, the sensor data may indicate a geographic location of the environment, and the step of determining the privacy level of the environment may include (1) querying a remote source using the geographic location of the environment for additional information about the environment and (2) using the additional information to determine the privacy level of the environment.

In at least one embodiment, the method may further include reporting to an administrator the environment in which the user is attempting to access the sensitive data and/or the privacy level of the environment.

In one embodiment, a system for implementing the above-described method may include (1) a detection module programmed to detect an attempt by a user to access sensitive data on a mobile computing device, (2) a collection module programmed to collect, via at least one sensor of the mobile computing device, sensor data that is indicative of an environment in which the user is attempting to access the sensitive data, (3) a determination module programmed to determine, based at least in part on the sensor data, a privacy level of the environment, (4) a restricting module programmed to restrict, based at least in part on the privacy level of the environment, the attempt by the user to access the sensitive data according to a DLP policy, and (5) at least one processor configured to execute the detection module, the collection module, the determination module, and the restricting module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) detect an attempt by a user to access sensitive data on a mobile computing device, (2) collect, via at least one sensor of the mobile computing device, sensor data that is indicative of an environment in which the user is attempting to access the sensitive data, (3) determine, based at least in part on the sensor data, a privacy level of the environment, and (4) restrict, based at least in part on the privacy level of the environment, the attempt by the user to access the sensitive data according to a DLP policy.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
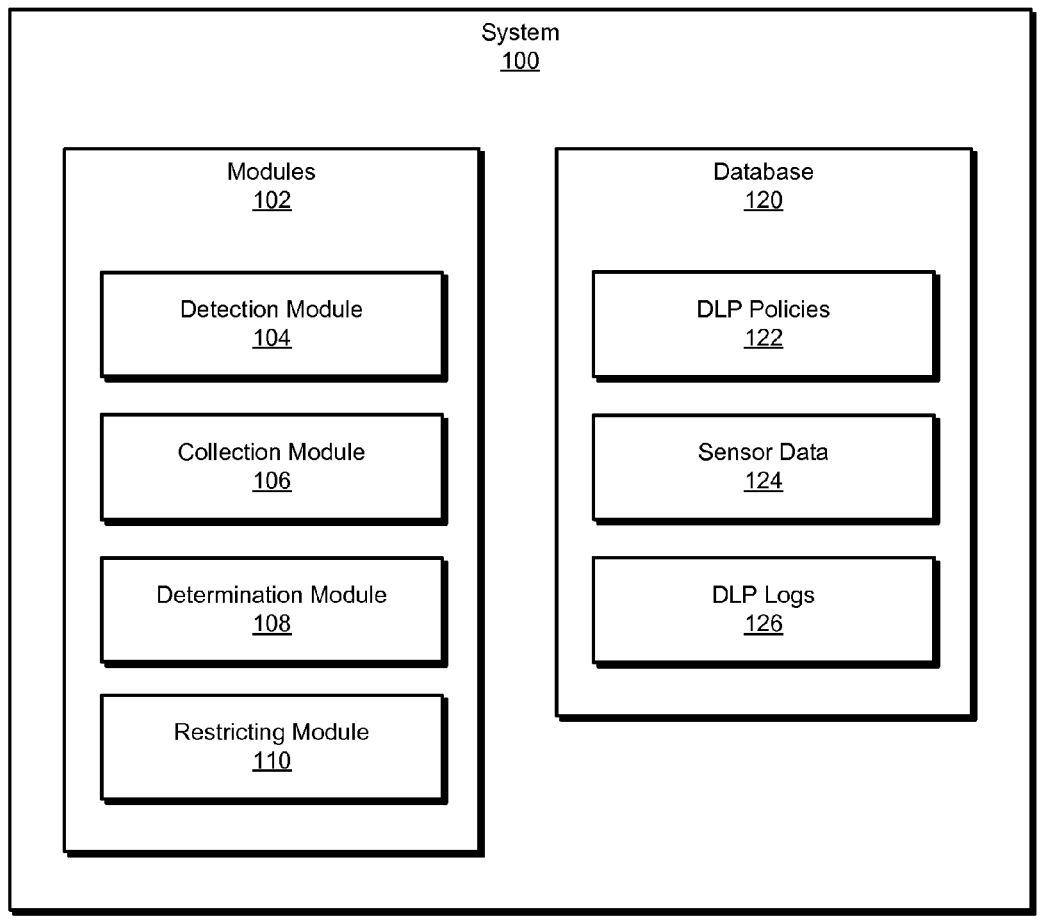
FIG. 1 is a block diagram of an exemplary system for enforcing data-loss-prevention policies using mobile sensors.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for enforcing data-loss-prevention policies using mobile sensors. As will be explained in greater detail below, by using sensor data collected via mobile sensors to infer characteristics of the environments within which users access sensitive data, the systems and methods described herein may enable flexible and effective data-loss-prevention strategies based on environmental risk factors of data loss. Furthermore, in some examples, by enforcing data-loss-prevention policies using mobile sensors, these systems and methods may enable mobile access to sensitive data in a way that minimizes the risk of unauthorized access to the sensitive data.

Moreover, by logging characteristics of the environments within which users access sensitive data, these systems and methods may enable a DLP administrator to better understand sensitive-data access patterns and better manage DLP policies based on environmental characteristics.

Figure 2:
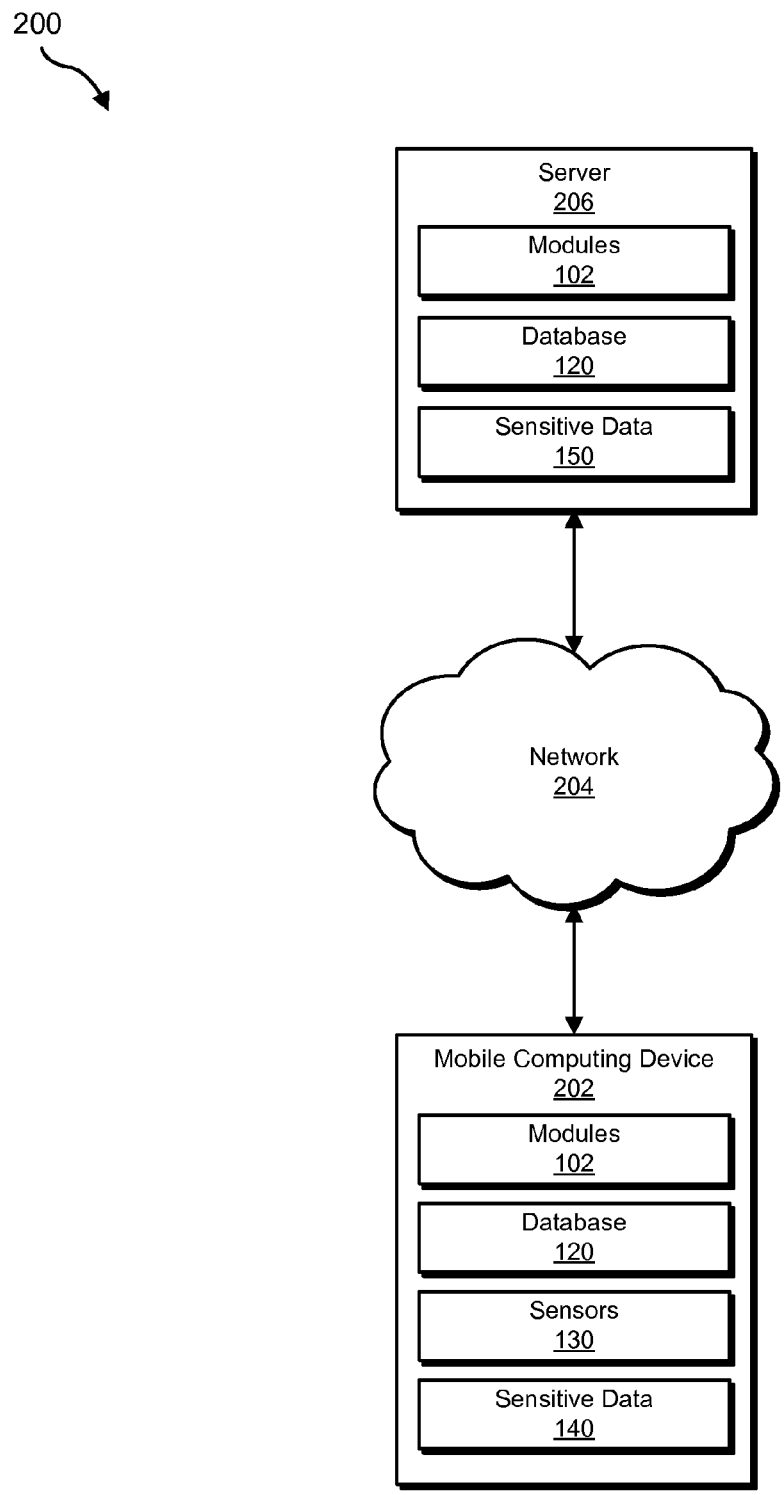
FIG. 2 is a block diagram of an exemplary system for enforcing data-loss-prevention policies using mobile sensors.

The following will provide, with reference to FIGS. 1-2, detailed descriptions of exemplary systems for enforcing data-loss-prevention policies using mobile sensors. Detailed descriptions of corresponding computer-implemented methods and data flows will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for enforcing data-loss-prevention policies using mobile sensors. As illustrated in this figure, exemplary system 100 may include one or more modules 102 for performing one or more tasks. For example, and as will be explained in greater detail below, exemplary system 100 may include a detection module 104 programmed to detect an attempt by a user to access sensitive data on a mobile computing device. Exemplary system 100 may also include a collection module 106 programmed to collect, via at least one sensor of the mobile computing device, sensor data that is indicative of an environment in which the user is attempting to access the sensitive data.

In addition, and as will be described in greater detail below, exemplary system 100 may include a determination module 108 programmed to determine, based at least in part on the sensor data, a privacy level of the environment. Exemplary system 100 may also include a restricting module 110 programmed to restrict, based at least in part on the privacy level of the environment, the attempt by the user to access the sensitive data according to a DLP policy. Although illustrated as separate elements, one or more of modules 102 in FIG. 1 may represent portions of a single module or application. In at least one example, one or more of modules 102 in FIG. 1 may represent at least a portion of a DLP system configured to protect sensitive data according to one or more DLP policies.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., mobile computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include DLP policies 122 for storing information about one or more DLP policies, sensor data 124 for storing information about sensor data collected via mobile sensors, and DLP logs 126 for storing information about attempts to access sensitive data, environments, and/or privacy level information.

Database 120 may represent portions of a single database or computing device or a plurality of databases or computing devices. For example, database 120 may represent a portion of mobile computing device 202 and/or server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as mobile computing device 202 and/or server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a mobile computing device 202 in communication with a server 206 via a network 204. Mobile computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of mobile computing device 202 and/or server 206, facilitate mobile computing device 202 and/or server 206 in enforcing data-loss-prevention policies using mobile sensors. For example, and as will be described in greater detail below, one or more of modules 102 may cause mobile computing device 202 and/or server 206 to (1) detect an attempt by a user to access sensitive data (e.g., sensitive data 140 or sensitive data 150) on mobile computing device 202, (2) collect sensor data that indicates an environment in which the user is attempting to access the sensitive data via at least one sensor (e.g., one or more of sensors 130) of mobile computing device 202, (3) determine a privacy level of the environment based at least in part on the sensor data, and (4) restrict the attempt by the user to access the sensitive data based at least in part on the privacy level of the environment according to a DLP policy.

Mobile computing device 202 generally represents any type or form of computing device that is capable of reading computer-executable instructions. Examples of mobile computing device 202 include, without limitation, laptops, tablets, cellular phones, Personal Digital Assistants (PDAs), multimedia players, desktops, servers, embedded systems, combinations of one or more of the same, exemplary computing system 510 in FIG. 5, or any other suitable computing device.

Mobile computing device 202 may include a variety of sensors 130 that may be used to gather information about the environments within which mobile computing device 202 operates and/or users of mobile computing device 202 access sensitive data. Examples of sensors 130 include, without limitation, global positioning system (GPS) sensors, network sensors (e.g., a BLUETOOTH adapter), audio sensors (e.g., a microphone), image sensors, accelerometers, gyroscopes, light sensors, proximity sensors, temperature sensors, barometers, and/or any other sensor capable of gathering information about the environments within which mobile computing device 202 operates.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between mobile computing device 202 and server 206.

Figure 3:
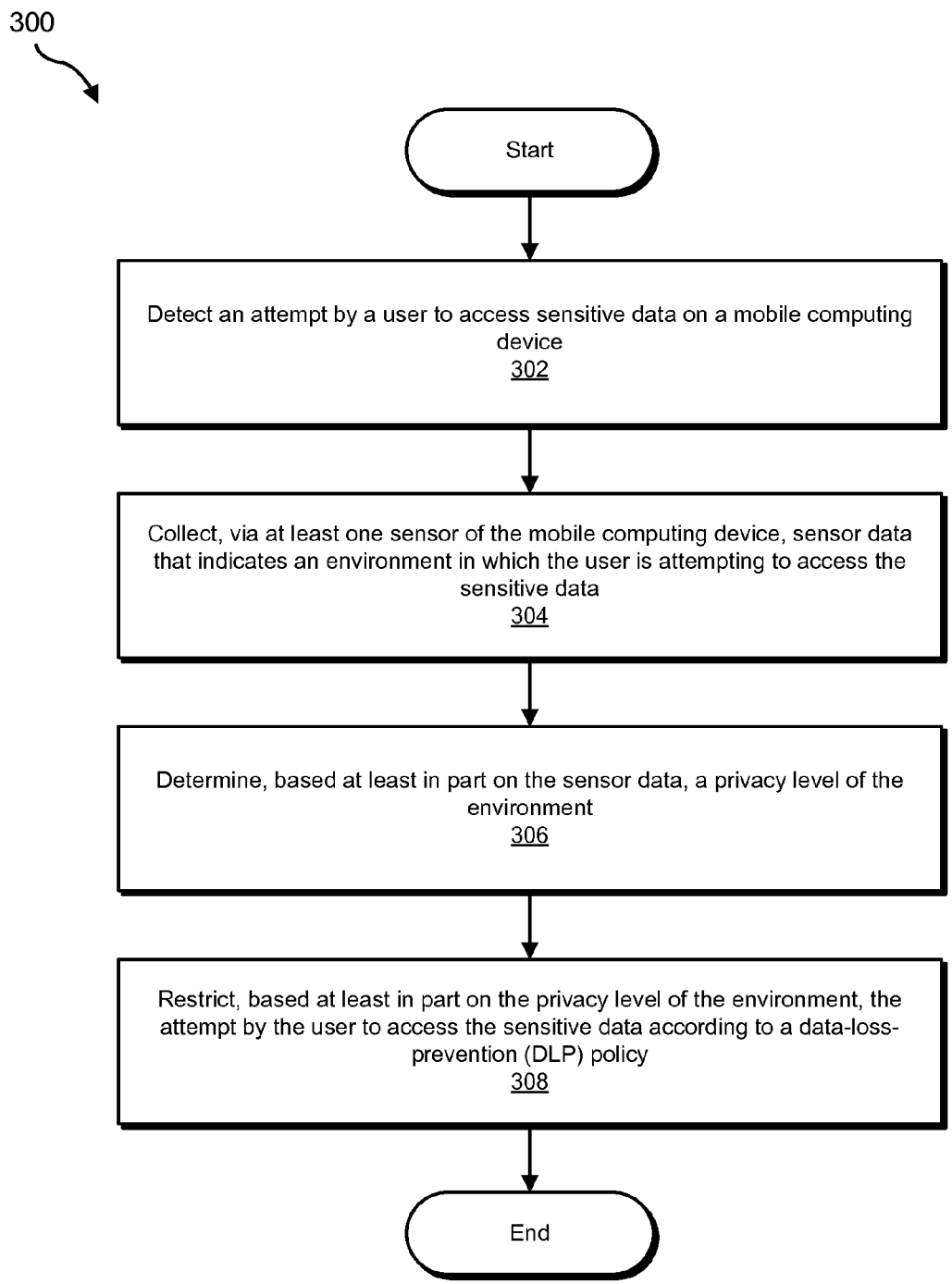
FIG. 3 is a flow diagram of an exemplary method for enforcing data-loss-prevention policies using mobile sensors.
Figure 4:
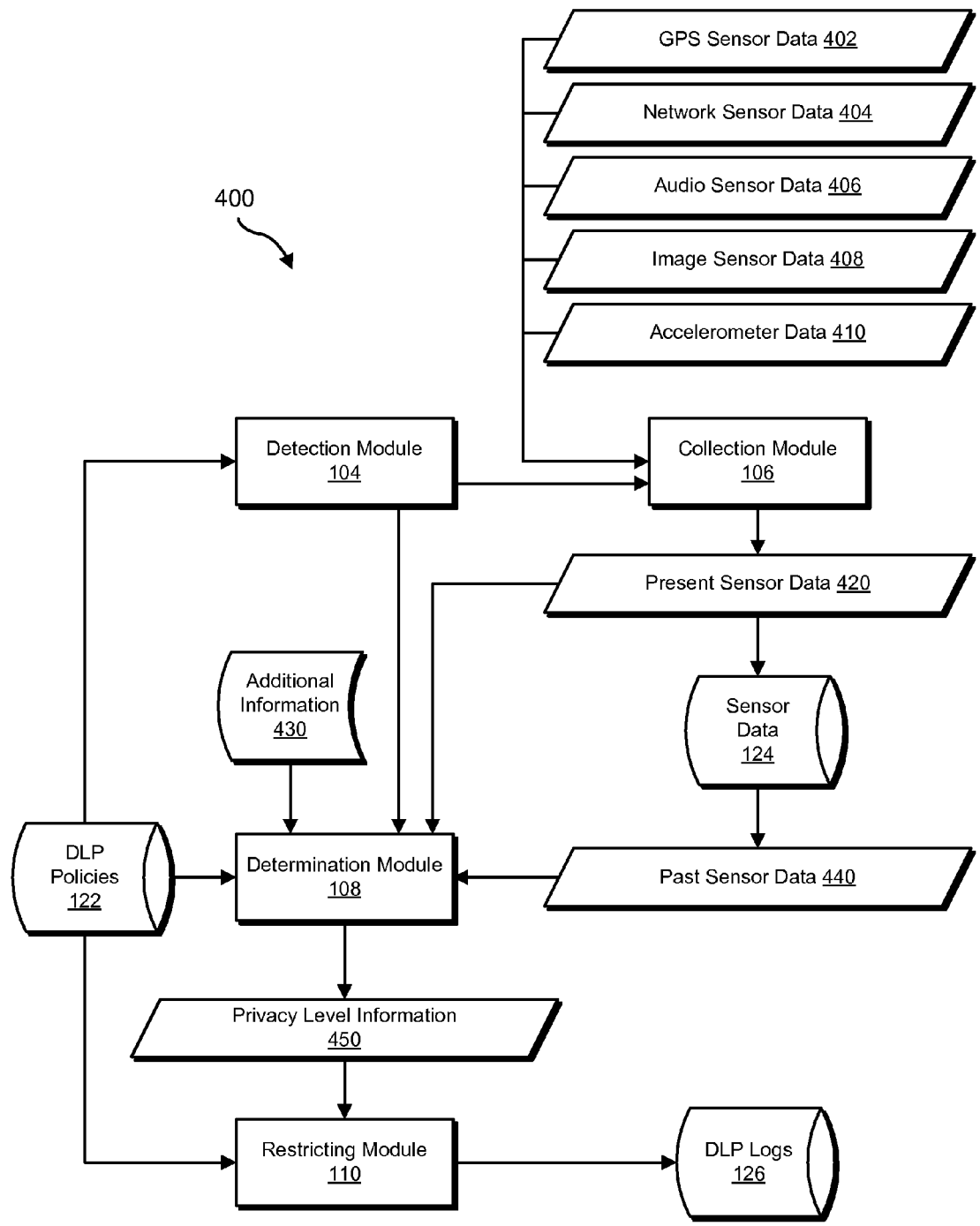
FIG. 4 is a flow diagram of an exemplary data flow for enforcing data-loss-prevention policies using mobile sensors.

FIG. 3 is a flow diagram of an exemplary computer-implemented method 300 for enforcing data-loss-prevention policies using mobile sensors. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6. FIG. 4 is a flow diagram of exemplary data flow 400. FIG. 4 illustrates how data may flow among modules 102 in FIG. 1 and/or FIG. 2 as modules 102 enforce DLP policies according to the step shown in FIG. 3.

As illustrated in FIG. 3, at step 302 one or more of the systems described herein may detect an attempt by a user to access sensitive data on a mobile computing device. For example, at step 302 detection module 104 may, as part of mobile computing device 202 and/or server 206 in FIG. 2, detect an attempt by a user of mobile computing device 202 to access sensitive data 140 and/or sensitive data 150.

The systems described herein may perform step 302 in any suitable manner. In one example, detection module 104 may represent a portion of a DLP system that protects sensitive data according to DLP policies 122. As illustrated in FIG. 4, detection module 104 may access information specified in DLP policies 122 to identify and then monitor attempts to access sensitive data.

In one example, detection module 104 may include an application running on mobile computing device 202 that is used to manage access to sensitive data on mobile computing device 202 and/or detect when a user of mobile computing device 202 attempts to access sensitive data. Additionally and/or alternatively, detection module 104 may include an application running on server 206 that is used to provide remote access to sensitive data via mobile computing device 202.

As used herein, the term "sensitive data" may generally refer to any data that, if revealed or disclosed to untrusted and/or unapproved individuals or entities, may result in the loss of confidentiality, privacy, and/or security. Examples of sensitive data may include, without limitation, personally identifiable information (e.g., information about a private individual, such as an individual's name, age, gender, Social Security number, credit card numbers, and contact information), confidential data (e.g., Social Security numbers, credit card numbers, or health histories), confidential business data (e.g., trade secrets or other intellectual property, sales and marketing plans, legal documents, pricing information, and financial data), or any other data that an individual or organization may wish to protect or keep private.

In general, a DLP system may manage the protection of sensitive data through the use of DLP policies. As used herein, the term "DLP policy" may generally refer to any policy that specifies how access to sensitive data should be managed. For example, a DLP policy may include (1) information that may be used to identify sensitive data (e.g., keywords, expressions, patterns, file names, or file types) and/or (2) conditions for restricting access to sensitive data. As will be explained in greater detail below, the privacy level of an environment may be used as a condition for restricting attempts to access sensitive data within the environment.

In some examples, DLP policies may be defined by a DLP administrator. In one example, a DLP administrator may use a DLP policy to specify a privacy level that will be required of environments before access to certain sensitive data may take place. In another example, the DLP administrator may use a DLP policy to indicate that a user's attempts to access sensitive data should be allowed, denied, or limited if certain environmental characteristics are present when the user attempts to access the sensitive data. In some examples, the DLP administrator may also use a DLP policy to indicate specific instructions for limiting access to sensitive data within environments associated with certain privacy levels.

At step 304, one or more of the systems described herein may collect sensor data that is indicative of an environment in which the user is attempting to access the sensitive data via at least one sensor of the mobile computing device. For example, at step 304 collection module 106 may, as part of mobile computing device 202 in FIG. 2, collect sensor data that is indicative of an environment in which the user of mobile computing device 202 is attempting to access sensitive data.

The term "environment", as used herein, generally refers to the environmental context (e.g., circumstances, objects, or conditions) within which a user attempts to access sensitive data via a mobile computing device. Examples of environments within which a user may attempt to access sensitive data may include, without limitation, the user's place of employment, the user's home, an empty restaurant, a busy airport, an airplane, the user's automobile, and/or any other public or private environment. The privacy level of an environment within which a user accesses sensitive data may increase or decrease the risk that the sensitive data will be lost. For example, a public environment may correlate with a greater risk of data loss, while a private environment may correlate with a lesser risk of data loss. As will be explained in greater detail below, specific characteristics of an environment may contribute to the privacy level of the environment and may be identified using data collected via sensors of the mobile computing device.

The systems described herein may collect sensor data that is indicative of the environment (e.g., environmental characteristics) in which the user is attempting to access the sensitive data in any suitable manner. As used herein, the term "sensor data" may refer to any data acquired via a sensor accessible via a mobile computing device. The term "sensor", as used herein, may generally refer to any device capable of measuring characteristics of environments. Examples of sensors include, without limitation, GPS sensors, network sensors (e.g., a BLUETOOTH adapter), audio sensors (e.g., a microphone), image sensors, accelerometers, gyroscopes, light sensors, proximity sensors, temperature sensors, barometers, and/or any other suitable sensor that may be used to collect data about the environment within which a mobile computing device operates.

Collection module 106 may collect data before, when, or after an attempt to access sensitive data within an environment is detected. Additionally and/or alternatively, collection module 106 may collect sensor data at times unrelated to attempts to access sensitive data. For example, collection module 106 may periodically collect and store sensor data for later analysis and/or reporting.

Using FIG. 4 as an example, collection module 106 may collect GPS sensor data 402 via a GPS sensor, network sensor data 404 via a network sensor, audio sensor data 406 via an audio sensor, image sensor data 408 via an image sensor, and/or accelerometer data 410 via an accelerometer. As shown, collection module 106 may provide present sensor data 420 (e.g., sensor data collected when an attempt to access sensitive data has been detected) to determination module 108 directly and/or may store present sensor data 420 to sensor data 124.

Returning to FIG. 3 at step 306, one or more of the systems described herein may determine, based at least in part on the sensor data, a privacy level of the environment. For example, at step 306 determination module 108 may, as part of mobile computing device 202 and/or server 206 in FIG. 2, determine a privacy level of the environment in which a user is attempting to access sensitive data on mobile computing device 202.

The systems described herein may perform step 306 in any suitable manner. As used herein, the term "privacy level" generally refers to any condition for restricting an attempt to access sensitive data that is based on characteristics of the environment within which the attempt takes place. For example, a privacy level of an environment may be based on the geographic location of the environment (e.g., a specific location, such as a GPS location, or a general location, such as "at work" or "at home"), the venue type of the environment (e.g., "airport" or "restaurant"), the number of people within the environment, the proximity of people within the environment to the mobile computing device on which an attempt takes place, the number of other computing devices within the environment, and/or an orientation and/or position of the mobile computing device in the environment.

A privacy level of an environment may be based on the characteristics of the environment in a variety of ways. In one example, a privacy level of an environment may represent a privacy classification of the environment (e.g., "public" or "private") that is based on characteristics of the environment. For example, a DLP policy may indicate that access to sensitive data may be allowed in private environments. Determination module 108 may classify the privacy level of an environment using any suitable algorithm and/or heuristic based on characteristics of the environment. In at least one example, determination module 108 may base the classification on predetermined risks of data loss associated with the characteristics of the environment.

In other examples, a privacy level may represent a level of privacy on a privacy scale (e.g., a scale ranging from 0 to 100). For example, a DLP policy may indicate that an attempt to access sensitive data may be allowed if the privacy level of the environment within which the attempt takes place is above a specific privacy level. Determination module 108 may determine the level of privacy using any suitable algorithm and/or heuristic based on characteristics of the environments. In at least one example, the privacy scale may represent a risk of data loss, and determination module 108 may base the level of privacy of the environment on predetermined risks of data loss associated with characteristics of the environment.

In another example, a privacy level may indicate the presence and/or absence of certain environmental characteristics within an environment. For example, a DLP policy may indicate that an attempt by a user to access sensitive data may be allowed if the environment within which the attempt takes place is "at work" and the user is indoors. Determination module 108 may use the sensor data collected at step 304 to identify the characteristics of the environment that will be used to determine the privacy level of the environment.

Using FIG. 4 as an example, determination module 108 may identify the characteristics of an environment using present sensor data 420. For example, determination module 108 may identify the geographic location of the environment using GPS sensor data 402 and/or network sensor data 404.

Determination module 108 may determine the number of people within the environment by comparing audio sensor data 406 with a set of predefined audio profiles. For example, determination module 108 may determine that the environment is crowded by comparing audio sensor data 406 with a set of audio profiles of crowded environments. In another example, determination module 108 may use image sensor data 408 to determine the number of people within the environment and/or the proximity of people within the environment (e.g., using a facial recognition system).

In some examples, determination module 108 may determine the number of additional computing devices present within an environment by using network sensor data 404 (e.g., Bluetooth and other near-field-communication sensor data) to discover other computing devices that are within the environment.

In other examples, determination module 108 may use accelerometer data 410 combined with GPS sensor data 402 to determine whether the environment is in motion and at what speed. In another example, determination module 108 may use accelerometer data 410 (e.g., combined with light and proximity sensor readings) to determine the orientation or position of the mobile computing device within the environment.

In some examples, determination module 108 may identify additional information 430 about the characteristics of an environment using sensor data. For example, determination module 108 may use the geographic location of the environment to query a mapping database (e.g., a remote and/or third-party mapping database) to determine the venue type of the environment. Determination module 108 may also query other remote sources using the geographic location of the environment for additional information about the environment. For example, determination module 108 may query a weather service for a temperature associated with the geographic location. In one example, determination module 108 may compare this temperature with a temperature measurement acquired via a temperature sensor to determine, for example, if the environment is indoors or outdoors.

In addition to using present sensor data 420 and as shown in FIG. 4, determination module 108 may identify characteristics of the environment using past sensor data 440. For example, determination module 108 may analyze past GPS sensor data that is associated with the environment and that has been correlated with the time of day at which the sensor data was collected in order to establish a venue type of the environment. For example, determination module 108 may associate past GPS sensor data collected during working hours with the venue type "at work" and/or associate past GPS sensor data collected during sleeping hours with the venue type "at home".

Returning to FIG. 3 at step 308, one or more of the systems described herein may restrict, based at least in part on the privacy level of the environment, the attempt by the user to access the sensitive data according to a DLP policy. For example, at step 308 restricting module 110 may, as part of mobile computing device 202 and/or server 206 in FIG. 2, restrict an attempt by a user of mobile computing device 202 to access sensitive data 140 or sensitive data 150 based at least in part on the privacy level of the environment within which the user attempts to access the sensitive data.

The systems described herein may perform step 308 in any suitable manner. As mentioned above, access to sensitive data may be conditioned on environmental privacy levels. Using FIG. 4 as an example, restricting module 110 may restrict an attempt to access sensitive data by (1) identifying a DLP policy from DLP policies 122 that is associated with the sensitive data, (2) identifying a privacy level condition in the DLP policy, (3) determining if the condition is met by comparing the condition with privacy level information 450 received from determination module 108, and (4) allow, deny, and/or limit the attempt to access the sensitive data based on the comparison.

In some examples, restricting module 110 may limit a user's access to sensitive data by allowing the user to access the sensitive data only through a secure application running on the mobile computing device that, for example, encrypts the sensitive data and/or prohibits the user from copying, saving, and/or emailing the sensitive data.

In other examples, restricting module 110 may enforce additional protection requirements based on the privacy level of an environment. For example, restricting module 110 may gather additional authentication information from a user before allowing the user to access sensitive data, limit the amount of time that the user has access to the sensitive data (e.g., restricting module 110 may limit the amount of time that the sensitive data is visible to the user), and/or prevent the user from accessing the sensitive data when the mobile computing device is in certain orientations or positions.

In addition to restricting access to the sensitive data, restricting module 110 may also report to a DLP administrator information about the attempt to access sensitive data, the environment in which the user attempted to access the sensitive data, the privacy level of the environment so that the DLP administrator may use this information to refine DLP policies based on environmental characteristics. Upon completion of step 308, exemplary method 300 in FIG. 3 may terminate.

As explained above, by using sensor data collected via mobile sensors to infer characteristics of the environments within which users access sensitive data, the systems and methods described herein may enable flexible and effective data-loss-prevention strategies based on environmental risk factors of data loss. Furthermore, in some examples, by enforcing data-loss-prevention policies using mobile sensors, these systems and methods may enable mobile access to sensitive data in a way that minimizes the risk of unauthorized access to the sensitive data.

Moreover, by logging characteristics of the environments within which users access sensitive data, these systems and methods may enable a DLP administrator to better understand sensitive-data access patterns and better manage DLP policies based on environmental characteristics.

For example, the systems and methods described herein may enable a DLP administrator to create a DLP policy that conditions access to sensitive data on environmental characteristics. Upon detecting an attempt to access the sensitive data via a mobile computing device, the systems and methods described herein may use sensor data collected via sensors of the mobile computing device to determine if the conditions based on environmental characteristics have been met before allowing, denying, or limiting the attempt to access the sensitive data.

Figure 5:
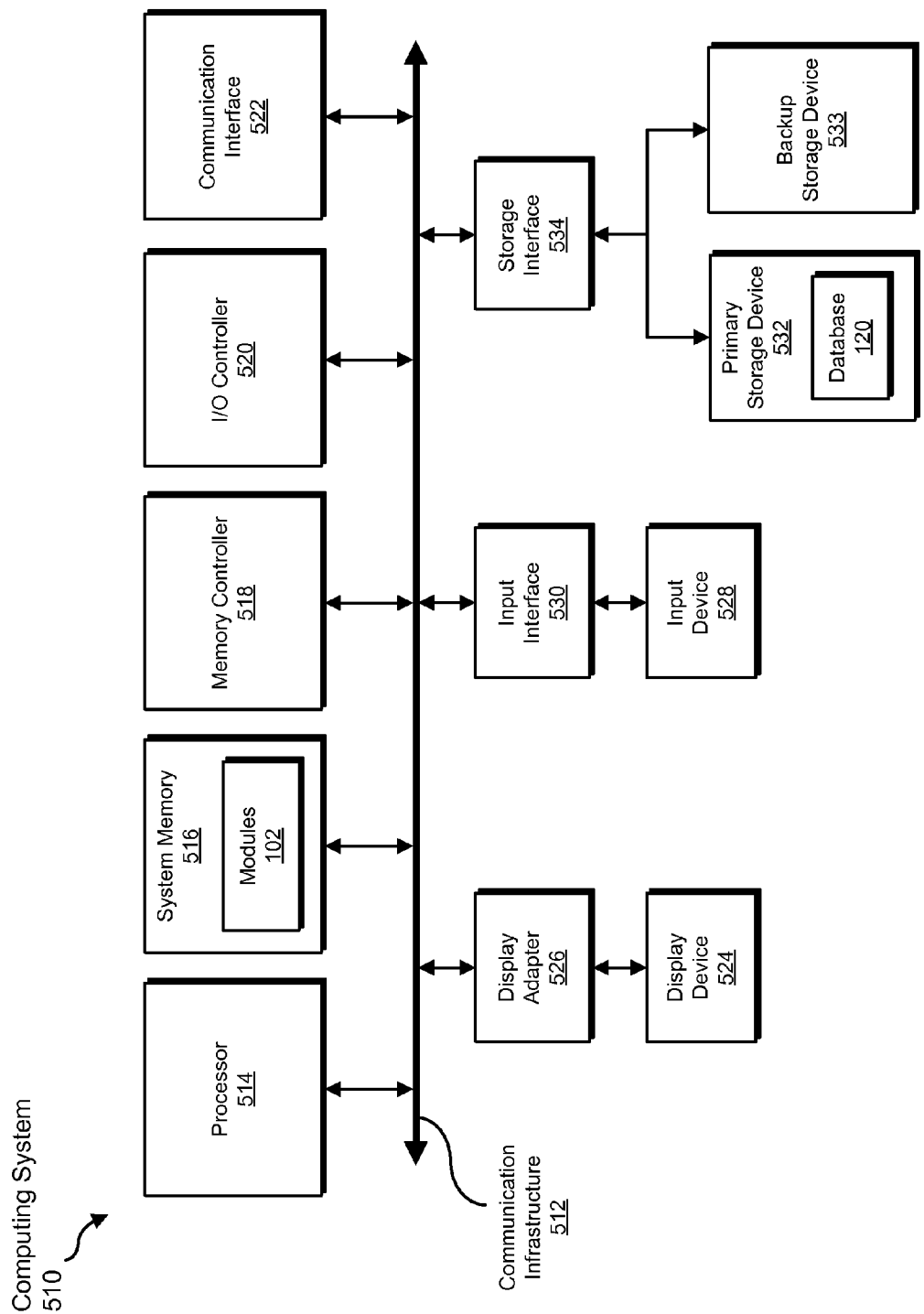
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the detecting, collecting, determining, restricting, using, querying, analyzing, comparing, and/or enforcing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
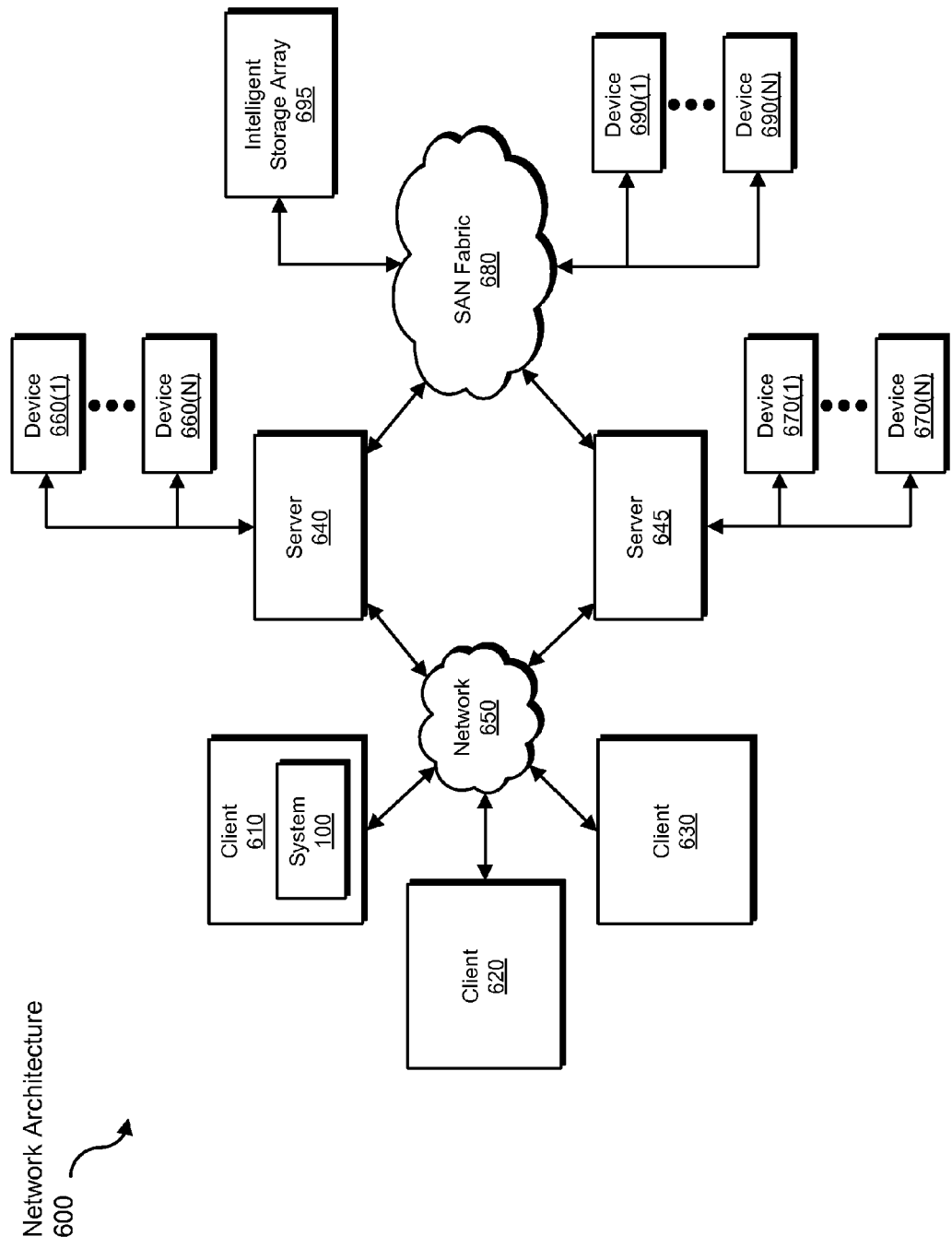
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the detecting, collecting, determining, restricting, using, querying, analyzing, comparing, and/or enforcing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for enforcing data-loss-prevention policies using mobile sensors.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive sensor data via a sensor of a mobile computing device to be transformed, transform the sensor data into a privacy level of an environment within which the mobile computing device is used to access sensitive data, output a result of the transformation to a data-loss-prevention system that manages access to the sensitive data, use the result of the transformation to enforce a data-loss-prevention policy, and store the result of the transformation to a database for storing information about attempts to access sensitive data (e.g., for reporting purposes). Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for enforcing data-loss-prevention policies using mobile sensors, at least a portion of the method being performed by a computing device comprising at least one processor, the method comprising:
   detecting an attempt by a user to access sensitive data on a mobile computing device;
   collecting, via at least one sensor of the mobile computing device, audio sensor data that is indicative of an environment in which the user is attempting to access the sensitive data;
   determining a privacy level of the environment by comparing the audio sensor data with a set of predefined audio profiles of environments, wherein
   a first predefined audio profile within the set of predefined audio profiles is correlated with a first risk of data loss;
   a second predefined audio profile within the set of predefined audio profiles is correlated with a second risk of data loss that is different than the first risk of data loss;
   restricting, based at least in part on the privacy level of the environment determined by comparing the audio sensor data with the set of predefined audio profiles, the attempt by the user to access the sensitive data.

2. The method of claim 1, wherein the privacy level of the environment represents a privacy classification of the environment.

3. The method of claim 1, wherein determining the privacy level of the environment further comprises using the audio sensor data to identify a venue type of the environment that comprises a risk factor for data loss.

4. The method of claim 3, wherein:
the audio sensor data indicates a geographic location of the environment;
using the audio sensor data to identify the venue type of the environment comprises querying a venue-type database using the geographic location for the venue type of the environment.

5. The method of claim 1, wherein the sensor of the mobile computing device comprises at least one of:
an audio sensor;
a microphone;
a network sensor;
a proximity sensor.

6. The method of claim 5, wherein collecting the audio sensor data comprises collecting the audio sensor data before, when, or after the attempt by the user to access the sensitive data is detected.

7. The method of claim 5, wherein collecting the audio sensor data comprises collecting the audio sensor data at times unrelated to the attempt by the user to access the sensitive data.

8. The method of claim 1, wherein restricting the attempt by the user to access the sensitive data comprises restricting the attempt by the user to access the sensitive data according to a data-loss-prevention (DLP) policy.

9. The method of claim 8, wherein restricting the attempt by the user to access the sensitive data according to the DLP policy comprises at least one of:
gathering additional authentication information from the user before allowing the user to access the sensitive data;
limiting an amount of time that the user has access to the sensitive data;
preventing the user from accessing the sensitive data when the computing device is in certain orientations or positions associated with the environment.

10. The method of claim 8, wherein restricting the attempt by the user to access the sensitive data according to the DLP policy comprises allowing the user to access the sensitive data only through a secure application running on the mobile computing device that encrypts the sensitive data.

11. The method of claim 8, wherein restricting the attempt by the user to access the sensitive data according to the DLP policy comprises prohibiting the user from at least one of copying, saving, or emailing the sensitive data.

12. The method of claim 1, wherein:
collecting the audio sensor data comprises:
collecting, prior to the attempt by the user to access the sensitive data, past audio sensor data that is indicative of the environment in which the user is attempting to access the sensitive data;
collecting, in response to the attempt by the user to access the sensitive data, present audio sensor data that is indicative of the environment in which the user is attempting to access the sensitive data;
determining the privacy level of the environment comprises comparing the past audio sensor data with the present audio sensor data.

13. The method of claim 1, wherein:
the audio sensor data further indicates a geographic location of the environment;
determining the privacy level of the environment further comprises:
querying a remote source using the geographic location of the environment for additional information about the environment;
using the additional information to determine the privacy level of the environment.

14. The method of claim 1, further comprising reporting to an administrator at least one of:
the environment in which the user is attempting to access the sensitive data;
the privacy level of the environment.

15. A system for enforcing data-loss-prevention policies using mobile sensors, the system comprising:
a detection module programmed to detect an attempt by a user to access sensitive data on a mobile computing device;
a collection module programmed to collect, via at least one sensor of the mobile computing device, image sensor data that is indicative of an environment in which the user is attempting to access the sensitive data;
a determination module programmed to determine a privacy level of the environment by determining a number or proximity of people in the environment based at least in part on the image sensor data, wherein:
a first number or proximity of people in the environment is correlated with a first risk of data loss;
a second number or proximity of people in the environment is correlated with a second risk of data loss that is different than the first risk of data loss;
a restricting module programmed to restrict, based at least in part on the privacy level of the environment determined by determining the number or proximity of people in the environment based on the image sensor data, the attempt by the user to access the sensitive data;
at least one computer processor that executes the detection module, the collection module, the determination module, and the restricting module.

16. The system of claim 15, wherein the privacy level of the environment represents a privacy classification of the environment.

17. The system of claim 15, wherein the determination module is further programmed to determine the privacy level of the environment by using the image sensor data to identify a venue type of the environment that comprises a risk factor for data loss.

18. The system of claim 15, wherein the sensor of the mobile computing device comprises at least one of:
a network sensor;
a light sensor;
an image sensor;
a proximity sensor.

19. The system of claim 15, wherein the determination module is programmed to determine the number or proximity of people in the environment based at least in part on the image sensor data by using a facial recognition system to determine the number or proximity of people in the environment.

20. A non-transitory computer-readable medium comprising one or more computer-executable instructions that, when executed by at least one processor of a computing device, cause the computing device to:
detect an attempt by a user to access sensitive data on a mobile computing device;

collect, via at least one sensor of the mobile computing device, audio sensor data that is indicative of an environment in which the user is attempting to access the sensitive data;

determine a privacy level of the environment by comparing the audio sensor data with a set of predefined audio profiles of environments, wherein a first predefined audio profile within the set of predefined audio profiles is correlated with a first risk of data loss;

a second predefined audio profile within the set of predefined audio profiles is correlated with a second risk of data loss that is different than the first risk of data loss:

restrict, based at least in part on the privacy level of the environment determined by comparing the audio sensor data with the set of predefined audio profiles, the attempt by the user to access the sensitive data.

\* \* \* \* \*

UNITED STATES PATENT AND TRADEMARK OFFICE
CERTIFICATE OF CORRECTION

PATENT NO.       : 8,925,037 B2
APPLICATION NO.  : 13/733131
DATED            : December 30, 2014
INVENTOR(S)      : Daniel Marino et al.

Page 1 of 1

It is certified that error appears in the above-identified patent and that said Letters Patent is hereby corrected as shown below:

In the Claims

Claim 1, at column 16, line 58, should read:

profiles of environments, wherein:

Claim 5, at column 17, line 17, should read:

an audio sensor;

Claim 20, at column 19, line 7, should read:

profiles of environments, wherein:

Claim 20, at column 19, line 12, should read:

data loss that is different than the first risk of data loss;

Signed and Sealed this
Twenty-third Day of June, 2015

Michelle K. Lee
*Director of the United States Patent and Trademark Office*